United States Patent
Santa Cruz et al.

(10) Patent No.: US 7,484,658 B2
(45) Date of Patent: Feb. 3, 2009

(54) SYSTEM FOR CONSUMERS AT THE POINT OF PURCHASE/SALE TO AUTOMATICALLY INVEST FUNDS INTO A PERSONAL MONEY SAVING PROGRAM

(76) Inventors: Cathy D. Santa Cruz, 7630 Tholl Dr., Reno, NV (US) 89506; John Laurence Ohm, P.O. Box 11962, Reno, NV (US) 89510

( * ) Notice: Subject to any disclaimer, the term of this patent is extended or adjusted under 35 U.S.C. 154(b) by 149 days.

(21) Appl. No.: 11/225,365

(22) Filed: Sep. 13, 2005

(65) Prior Publication Data
US 2007/0057036 A1    Mar. 15, 2007

(51) Int. Cl.
*G06K 5/00*     (2006.01)
(52) U.S. Cl. .................. 235/380; 235/379; 235/381; 235/383; 705/4; 705/35; 705/36
(58) Field of Classification Search .......... 235/379, 235/380; 705/4, 16, 35, 36, 39, 42
See application file for complete search history.

(56) References Cited

U.S. PATENT DOCUMENTS

| | | | |
|---|---|---|---|
| 5,787,404 A * | 7/1998 | Fernandez-Holmann | 705/35 |
| 6,631,358 B1 * | 10/2003 | Ogilvie | 705/39 |
| 2004/0039675 A1 * | 2/2004 | Wallman | 705/36 |
| 2005/0080737 A1 * | 4/2005 | Stein et al. | 705/42 |
| 2006/0190343 A1 * | 8/2006 | Cooper | 705/26 |
| 2007/0011809 A1 * | 1/2007 | Chen et al. | 5/99.1 |

* cited by examiner

*Primary Examiner*—Michael G Lee
*Assistant Examiner*—Ali Sharifzada

(57) ABSTRACT

Herein taught is a system that allows an individual to automatically transfer funds into a personal money saving program via a retailer/wholesaler. The system is novel as a percent of the actual sales price is incorporated into the purchase/sale and the percent is credited to the purchaser. Also, we provide numerous options that result in various levels of memberships each having novel characteristics and great money saving potential.

11 Claims, 3 Drawing Sheets

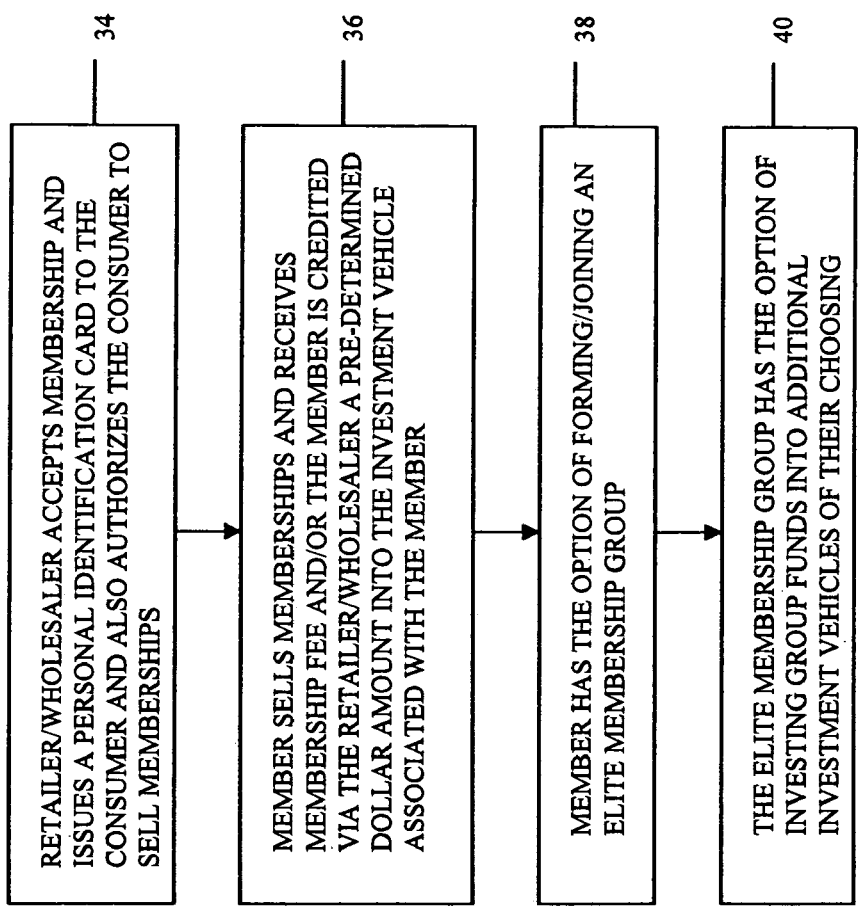

SYSTEM FOR CONSUMERS AT THE POINT OF PURCHASE/SALE TO AUTOMATICALLY INVEST FUNDS INTO A PERSONAL MONEY SAVING PROGRAM

FIELD OF THE INVENTION

The present invention relates in general to methods or systems that allow a consumer to invest funds into an investment vehicle via a purchase/sale from a retailer/wholesaler. However, the invention more particularly pertains to such methods or systems wherein the actual investment feature is automatically incorporated into the pricing structure at the point of purchase/sale by the retailer/wholesaler.

BACKGROUND OF THE INVENTION

Within the known prior art there have been numerous attempts to provide methods or systems that allow for a consumer to invest monies into an investment vehicle via purchase/sale from a retailer/wholesaler. For example, such methods or systems are taught within U.S. Pat. Nos. 6,876, 971, Re. 36116, U.S. Pat. Nos. 5,970,480, 5,202,826, 4,941, 090 and 5,117,355 each of which are similar and somewhat related to the present invention. Such prior art are somewhat functional for their intended use but each still include disadvantages and drawbacks that the present invention recognizes, addresses and resolves in a manner heretofore not taught.

A most important disadvantage and drawback within the prior art is the fact that each are restricted to requesting the consumer to pay an additional amount of money "over" the participating providers price. Therefore the consumer is simply transferring money from a checking or credit card account into a savings account, respectively via the retailer/wholesaler. This type of transaction is structured to benefit the retailer/wholesaler, banking or other financial service and is not specifically beneficial for the actual consumer. In general, these systems are designed to encourage the retailer/wholesaler to function as a transfer medium for banks and the like. Thus, the retailer/wholesaler include a fee for this service and make money from the transaction as opposed to the transaction being beneficial for the actual consumer.

There are certain retailer/wholesalers who are more reasonably priced when compared to their competitors and the present invention is most beneficial when incorporated within these specific types of retailer/wholesaler entities. For example, it would be most advantageous for all parties involved in the transaction if the savings were automatically incorporated into the actual sales price. Most retailer/wholesalers advertise and encourage consumers to buy products from them, as they are priced lower than their competitors and saving the consumer money. As a result the consumer is pleased as they feel they are getting a real bargain for their money spent. This not only results in more satisfied customers but also increased sales.

Furthermore, most customers who believe they are getting the best price tend to spread by word of mouth what great savings they have found by shopping at a specific store. As a result, most often this word of mouth between consumers is more valuable to the retailer/wholesaler than any other form of advertising. Therefore it is most beneficial for the retailer/wholesaler to encourage this type of communication between consumers.

Unfortunately in today's society it is very difficult for people to open savings or retirement accounts due to the fact most people don't have extra money to invest because we tend to live week-to-week or paycheck-to-paycheck. This is most discouraging and troublesome for most people, as they have no money for emergencies and no hope for retirement in the future years. Therefore, it is contended that if there were a way for the average consumer to actually invest money into a savings program automatically when making a purchase this would be very appealing and advantageous. For example, if a consumer knew that they were automatically investing in their future each and every time they made a purchase this would result in more satisfied customers and more sales. Therefore, if the retailer/wholesaler were to increase the actual sales price of an item (for members) to an equal amount when compared to their competitors this would be most appealing. To further exemplify the advantages and benefits of this analogy consider the following. A first store #1 offers an item for $2.00. A second store #2 offers the exact item for the same price, $2.00. However, the consumer knows that "being they are a member" of the second store #2, upon purchase a percent of the purchase price is automatically put into a money saving program for them as an investment. Therefore, even though each store offers the item for the same price, the consumer will prefer to shop at the second store because they are a member and desire to invest in the money saving program for their future. Thus resulting in a money saving program designed for the consumer as opposed to the retailer/wholesaler. However, the end result is advantageous and beneficial for all parties involved as will later be seen and taught herein.

OBJECTS AND ADVANTAGES OF THE PRESENT INVENTION

It is therefore a primary object of the present invention to provide a personal money saving program that is beneficial for the consumer as well as the retailer/wholesaler.

It is another object of the present invention to provide a personal money saving program that does not require the consumer to have a large amount of money for investment as required by most savings or checking accounts and the like.

Still a further object of the present invention is to provide a personal money saving program that encourages the consumer to consistently shop at a specific retail/wholesale store that is beneficial for the consumer as well as the retailer/wholesaler.

Yet a further object of the present invention is to provide a personal money saving program that includes alternatives for the consumer and the retailer/wholesaler.

Also another object of the present invention is to provide a personal money saving program that allows the consumer to choose the investment vehicle of their liking.

A further object of the present invention is to provide a personal money saving program that will aid the consumer in the retirement years.

Still another object off the present invention is to provide a personal money saving program that is also appealing to the retailer/wholesaler as it will increase sales and provide additional profit.

A further object of the present invention is to provide a personal money saving program that will reduce the need for expensive advertising for the retailer/wholesaler as word of mouth between consumers will be most beneficial.

Yet another object of the present invention is to provide a personal money saving program that allows members to sell memberships to other consumers. Thus, the members can make additional money as well as create a preferred members list of which will have control of the memberships and amounts pertaining thereto. Thus, resulting in an elite group of members who will have the potential for great savings.

Yet a further object of the present invention is to provide a personal money saving program wherein the afore mentioned elite group of members may also as a group transfer funds into a local Government trust account to buy gold. The local county/city uses its bonding capability to issue gold backed bonds and deposits bonds in the I.R.A. Upon retirement the consumer has accrued the annual percentage paid by the bond in addition to the majority of the appreciated price of gold.

Still a further object of the present invention is to provide a personal money saving program that will greatly help the economy and also result in lower taxes for everyone in a manner, which heretofore, has not been achievable.

BRIEF DESCRIPTION OF THE DRAWINGS

FIG. 3 is a block diagram depicting additional options associated with the preferred system of the present invention.

DETAILED DESCRIPTION OF THE DRAWINGS

Figure 1:
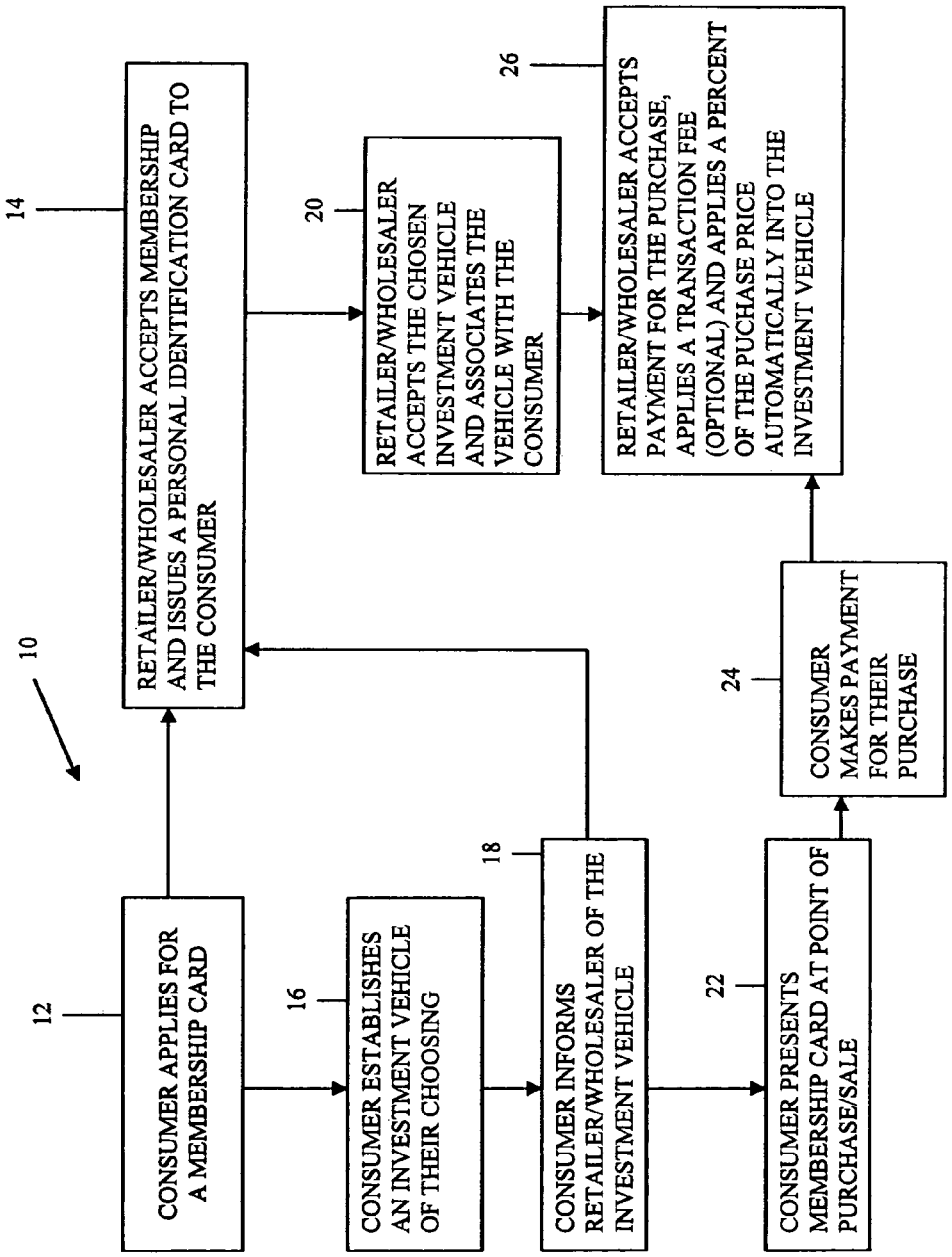
FIG. 1 is a block diagram depicting the preferred system for the personal money saving program of the present invention.

Referring now in general to the drawings wherein like characters refer to like elements throughout the various views. Within FIG. 1, we depict the preferred system for consumers at the point of purchase/sale to automatically invest funds into a personal money saving program via a retailer/wholesaler and which is represented by overview (10). The preferred system including a consumer applying for a personal membership card (12) with a retailer/wholesaler at which time the retailer/wholesaler provides identification means for associating/identifying (14) the consumer with the issued membership card. Thus upon approval the retailer/wholesaler supplies the consumer with the personal membership card. It is to be noted any suitable identification means of choice may be used. For example, the identification means may be in the form of numbers, letters, a bar code, etc. and also includes appropriate computer software associated therewith. It is to be further noted the actual software is not taught herein as suitable software exists and is well known within the field. Thus the present system is not to be limited to any specific type of identification means and/or computer programs/software.

After the consumer has been issued their personal membership card, they have to choose and establish (16) the type of investment vehicle they prefer. For example, the investment vehicle maybe chosen from the group including but not limited to an I.R.A, mutual funds, bonds, savings, checking, stocks, annuities, trust, etc. It is to be noted that if the investment vehicle is a saving account or the like, this is advantageous for the consumer as the account accrues interest payable to the consumer resulting in more profit, respectively. After the consumer has established the investment vehicle of their choice, they must then inform (18) the retailer/wholesaler thereof Whereby, the retailer/wholesaler upon notification/acceptance associates (20) the investment vehicle with the consumer.

Thereafter anytime the consumer makes a purchase, they present the membership card at the point of purchase/sale (22), the consumer makes payment for the purchase/sale (24) and the retailer/wholesaler upon receiving payment applies a percent of the purchase/sale (26) automatically into the investment vehicle associated with the consumer. It is to be noted that the retailer/wholesaler may charge a transaction fee (optional) to cover any cost. Furthermore, this system may include that the percent of the purchase/sale is not applied if the purchase/sale is less than a specified pre-determined agreed upon dollar amount. For example, if the consumer makes a purchase/sale for only $10.00 the percent is not applicable. Also, the pre-determined agreed upon dollar amount may be determined by either the consumer and/or the retailer/wholesaler.

It is to be understood the present system includes numerous options. For example, one option includes when the consumer applies for the membership card (12) the retailer/wholesaler may offer that the investment vehicle is a savings account that is determined, established and maintained by the retailer/wholesaler and the savings account accrues interest payable to the retailer/wholesaler. This option is an incentive for the retailer/wholesaler as this would help to cover any costs associated with the system and also provide a profit. To further enhance this option the noted savings account may include a provision that specifies an agreed to pre-determined period of time which restricts withdrawal of funds by the consumer until the agreed to pre-determined period of time has expired. Or if preferred, the noted savings account may include a provision that specifies an agreed to pre-determined cash limit which restricts withdrawal of funds by the consumer until the agreed to pre-determined cash limit has been attained.

Another option for the preferred system includes when the consumer applies for the membership card (12) the retailer/wholesaler may charge a membership fee that is determined by the retailer/wholesaler and payable thereto. This is again an incentive for the retailer/wholesaler as this would help to cover any costs associated with the system and also provide a profit.

Figure 2:
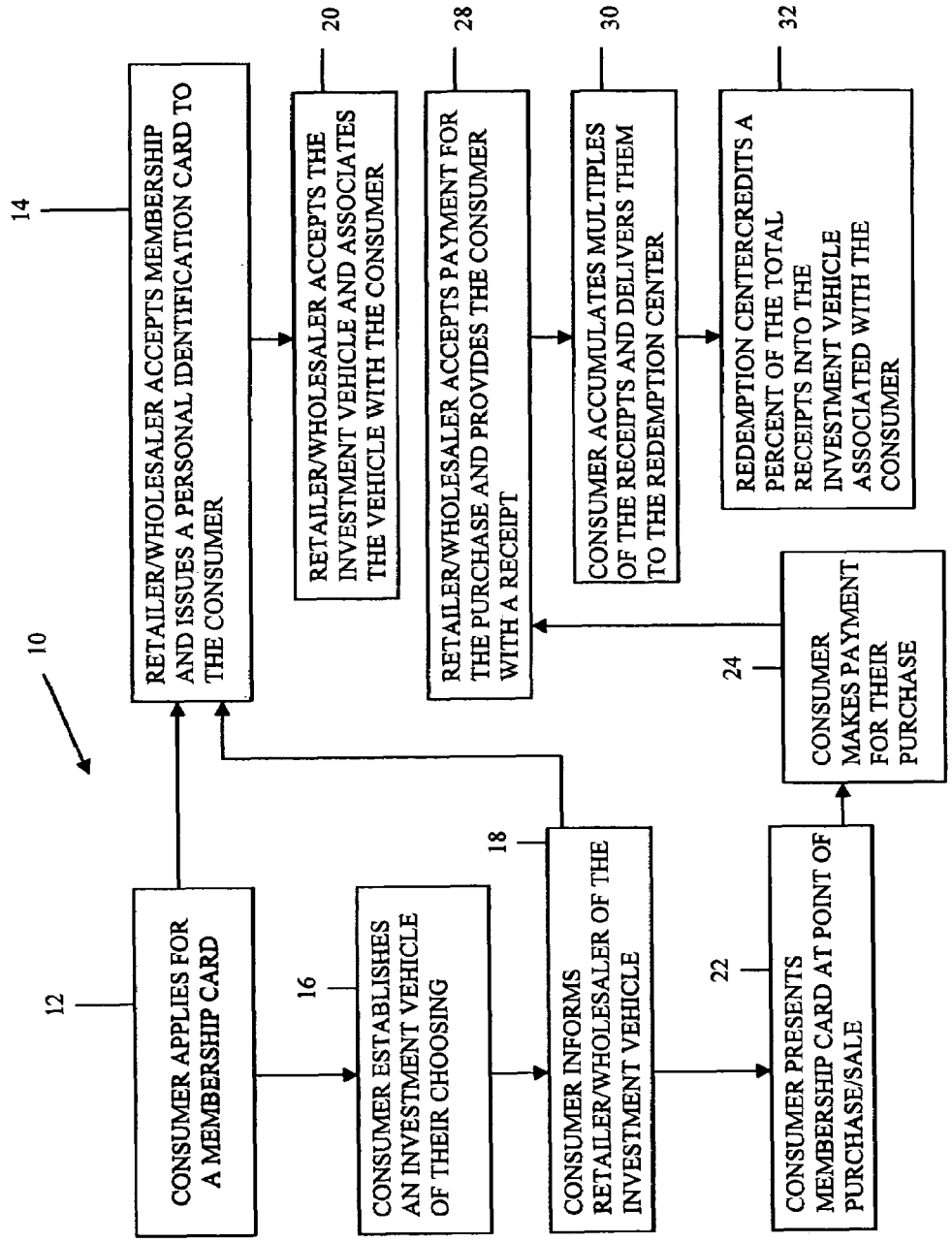
FIG. 2 is a block diagram depicting options associated with the preferred system for the present invention.

Yet a further option for the present system is depicted in FIG. 2. Wherein the option is to include a different means for the consumer and the retailer/wholesaler to credit the investment vehicle, namely the retailer/wholesaler provides a redemption center as follows: When the retailer/wholesaler receives payment for the point of purchase/sale, the retailer/wholesaler provides a receipt therefore (28). Thereafter, the consumer saves the receipt(s) until the consumer accumulates multiples of the receipts (30). The retailer/wholesaler sets a total pre-determined dollar amount. Whereby when the consumer has accumulated multiples of the receipt(s) that are equal to or more than the total pre-determined dollar amount the consumer takes the receipt(s) to the redemption center. Whereby, when the redemption center receives the receipt(s) an agreed to percent of the of the total pre-determined dollar amount is credited into the investment vehicle associated with the consumer (32). This option is very appealing, as this would reduce costs associated with the system in general. For example, the need for tracking and/or crediting at the point of purchase would be reduced and/or completely eliminated. Furthermore, extra costs for computer programs/software would also be greatly reduced or eliminated.

Another option for the present system is depicted in FIG. 3. Wherein the retailer/wholesaler authorizes the consumer after becoming a member to sell memberships to potential consumers (34). The consumer who is now a member, upon selling membership(s) receives payment from the new member, or the membership fee is credited into the investment vehicle associated with the member (36). It is to be noted this option further includes numerous variations. For example, one scenario includes the member upon selling a membership to a new member at the point of sale the member receives a membership fee from the new member. It is to be understood that the retailer/consumer may sell a membership for a certain dollar amount such as $50.00. The member who is authorized to sell may sell the membership for $40.00 as an example. Therefore, this not only encourages the member to sell memberships as they will make money, but it further encourages the new member to buy from the member because they will save $10.00 buying from the member as opposed to paying the full membership fee from the retailer/wholesaler.

Another scenario pertaining to the above option includes the member upon obtaining a new member supplies the new member with an identification item such as a business card or the like, that informs the retailer/consumer which member obtained the new member. For example, the member finds a potential new member, the member gives the identification item to the new member. Thereafter, when the new member applies for membership with the retailer/wholesaler and presents the I.D. card, the new member would pay the reduced membership fee of $40.00 that is then credited to the selling member's investment vehicle. This scenario is very effective even though the retailer/wholesaler does not receive the membership fee, the retailer/wholesaler would obtain many more members. Also, this would save money for the retailer/wholesaler, as the need for costly advertising would be eliminated.

Yet a further option includes a different scenario wherein the member has the option of the membership being less than, equal to or higher than the membership fee determined by the retailer/wholesaler. This provides additional advantages as this provides members an opportunity to make much more money. For example, the member sells a membership for $100.00. However, if the new member is informed that if the membership is bought from the member, they would automatically become part of an elite group membership and the elite group membership offers exceptional money saving potential. For example, the group membership has the option (if agreed to between members) of increasing membership fee's resulting in further profit. Also, more importantly the group membership has the option of transferring as a group, accumulated funds from each investment vehicle into a local government trust account to buy gold. The local government trust-account issues gold backed bonds. The gold backed bonds are then deposited into an I.R.A., whereby upon retirement of each group member, each group member has accrued the annual percentage paid by the bond in addition to the majority of the appreciated price of gold. As a further example, The I.R.A. account holder deposited $500.00 into their account. The local government trustee buys the gold and issues a 30-year bond paying 5%. Gold price per ounce is $500.00. At the end of 30 years, (assuming gold is $1000.00 per ounce) commencing at retirement the account holder would have $500.00 at 5% annually plus 70% of the appreciation of the gold, in this case $350.00. Also, and most importantly the taxing entity would have $650.00 in gold. Therefore greatly helping the local economy and resulting in reduced taxes. The overall results are: (a) the gold trust account continues to grow and at a future date may be used to defray taxes on the citizen (b) the demand for gold increases, driving the price upwards which in many states such as Nevada, increases the value of gold mining companies, (c) as the value of the gold mines increase, more tax is generated, (d) the individual's retirement is funded in addition to potential of increased income for introducing new members to the retailer, and (e) at a future time such as 10 to 20 years, there is more income per individual plus a funded retirement which puts less emphasis on taxing for social and entitlement programs, thus the professed need for taxes should go down, resulting in lower taxes for everyone.

It can now be seen we have herein provided a new and novel system for consumers at the point of purchase/sale to automatically invest funds into a personal money saving program via a retailer/wholesaler. Thus resulting in a system that heretofore has not been recognized, addressed or achieved.

Although the invention has been herein shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent methods and systems.

What is claimed is:

1. A method for consumers at the point of purchase/sale to automatically invest funds into a personal money saving program via a retailer/wholesaler comprising the steps of:

a consumer applying for a personal membership card with said retailer/wholesaler at which time said retailer/wholesaler provides an identification means for associating/identifying said consumer with said membership card, said consumer becoming a first member, said retailer/wholesaler upon approval supplying said first member with said personal membership card and charging a membership fee, said first member establishing an investment vehicle according to their choosing, said first member informing said retailer/wholesaler of said established investment vehicle, said retailer/wholesaler associating said investment vehicle with said membership card, said first member presenting said personal membership card at said point of purchase/sale, a pre-determined percent of an actual sales price is incorporated into said purchase/sale, said retailer/wholesaler receiving payment at said point of purchase/sale at which time said retailer/consumer applies said pre-determined percent of said purchase/sale automatically into said investment vehicle associated with said first member, said retailer/wholesaler authorizing said first member after becoming a member to sell memberships to potential members, said first member upon selling said membership to said potential member, said first member receiving a first member designated membership fee from said potential member, said retailer/wholesaler credits said first member designated membership fee into said investment vehicle associated with said member, said potential member becoming a second member, said second member registering with said retailer/wholesaler and establish an investment vehicle and receiving a membership card.

2. The method of claim 1 wherein said investment vehicle is selected from a group including an I.R.A., mutual funds, bonds, savings, checking, stocks, annuities, and trust.

3. The method of claim 1 wherein said investment vehicle is a savings account that is determined, established and maintained by said retailer/wholesaler and said savings account accrues interest payable to said retailer/wholesaler.

4. The method of claim 3 wherein said savings account is limited in use as said savings account includes a provision that specifies an agreed to pre-determined period of time which restricts withdrawal of funds by said member until said agreed to pre-determined period of time has expired.

5. The method of claim 3 wherein said savings account is limited in use as said savings account includes a provision that specifies an agreed to pre-determined cash limit which restricts withdrawal of funds by said member until said agreed to pre-determined cash limit has been attained.

6. The method of claim 1 wherein said investment vehicle is a savings account that is determined established and maintained by said consumer.

7. The method of claim 1 wherein said pre-determined percent of said purchase/sale is not applied if said purchase/sale is less than a specified pre-determined agreed upon dollar amount.

8. The method of claim 1 wherein said retailer/wholesaler charges a membership fee that is determined by said retailer/wholesaler and payable thereto.

9. The method of claim 1 wherein said first member upon selling a membership to said second member further includes said member having the option of said membership fee being determined by said retailer/wholesaler.

10. The method of claim 9 further includes if said first member sells said membership for a fee higher than said membership fee determined by said retailer/wholesaler, said first member and said second member become a group membership.

11. The method of claim 9 wherein said group membership has the option of transferring as a group accumulated funds from each said investment vehicle into a local government trust account to buy gold, said local government trust account issues gold backed bonds, said gold backed bonds are deposited into an I.R.A., whereby upon retirement of each said member of said group membership, each said member has accrued the annual percentage paid by the bond in addition to the majority of the appreciated price of gold.

* * * * *